United States Patent

Ulicki

[15] 3,649,123
[45] Mar. 14, 1972

[54] VARIABLE FREQUENCY PHASE MATCHING DISTANCE MEASURING AND POSITIONING DEVICE

[72] Inventor: Edward M. Ulicki, East Paterson, N.J.
[73] Assignee: Holobeam, Inc., Paramus, N.J.
[22] Filed: Apr. 16, 1969
[21] Appl. No.: 816,592

[52] U.S. Cl. ................................................. 356/5, 343/7.5
[51] Int. Cl. ..................................................... G01c 3/08
[58] Field of Search ................. 356/4, 5; 343/14, 17.5, 7.5, 343/12

[56] References Cited

UNITED STATES PATENTS

| 2,546,973 | 4/1951 | Chatterjea et al. | 343/10 |
| 2,779,018 | 1/1957 | Gregoire et al. | 343/12 |
| 2,921,301 | 1/1960 | Cartwright | 343/6 |

Primary Examiner—Rodney D. Bennett, Jr.
Assistant Examiner—Joseph M. Potenza
Attorney—Sandoe, Hopgood and Calimafde

[57] ABSTRACT

The invention is a laser driven distance measuring device, the output of which can be used to precisely control the distance between objects. Interrogating signals, modulated by a control signal, are beamed towards an object and the phase of reflected portions of these signals compared with that of the modulating control signal. The frequency of the transmitted signals is varied until a desired phase match between the transmitted and received signals is achieved. The distance to an object is determined mathematically from the value of two adjacent frequencies at which the designated phase relationship is observed to occur. By measuring the change in frequency of the modulating control signal necessary to effect the desired phase match with a reference frequency, a control signal is generated which can be utilized to adjust the distance measured.

4 Claims, 2 Drawing Figures

VARIABLE FREQUENCY PHASE MATCHING DISTANCE MEASURING AND POSITIONING DEVICE

BACKGROUND

The invention is in the field of electromagnetic distance measuring devices, and has particular application to laser driven range finders.

The invention is based in part upon the fact that phase is a multivalent function, repeating itself every 360°. This being true, there are a number of frequencies at which transmitted interrogating signals and their received reflections will coincide in phase. As the frequencies at which this condition exists are dependent upon the distance to the reflecting target, distance to the target can be calculated when two adjacent of such frequencies have been determined.

Additionally, by comparing the reflected signals to a reference frequency, and adjusting the frequency of the transmitted signals to achieve a selected phase match, the device of the invention can be utilized to generate an actuating signal to position one object with respect to another.

An objective of this invention is to provide a means for measuring distance using phase matching and frequency difference measurement.

Another objective of this invention is to provide a device for measuring distance which utilizes the inherently high accuracy of frequency measurement to improve the accuracy of distance measurement.

Still another objective of this invention is to provide a means for positioning objects with extreme accuracy.

SUMMARY

Basically the invention is an echo ranging type distance measuring device comprised of a transmitter which beams an electromagnetic signal to a target, and a receiver to pick up the reflected signals. The frequency of the transmitted signal is controlled by a variable frequency generator.

A phase detector means measures the phase difference between the transmitted and received signals, and produces a corresponding error signal. This error signal is applied to the variable frequency generator causing it to increase or decrease its output frequency until a first frequency $F_1$ is reached at which a selected phase match between the transmitted and received signals is achieved; at this frequency the error signal diminishes and the device stabilizes at $F_1$. A controllable signal source means then applies a perturbation signal to the variable frequency generator, sufficient to cause the device to cause the device to seek and stabilize at the next higher or lower frequency $F_2$ to $F_1$.

Storage register and computer means, responsive to $F_1$ and $F_2$ automatically record $F_1$ and $F_2$, calculate the distance to the target and cause the same to be displayed on suitable readout means.

Control means, sensitive to the variation of $F_1$ from a reference frequency, which reference frequency is characteristic of a desired distance to be maintained between the device and a target, can be employed to cause an adjustment in the measured distance to the desired value.

Among the many advantages of the invention are the following:

Distance measurement is accomplished by frequency measurement which can be performed much more accurately than conventional time measurement.

Accuracy of the device is limited only by the frequency measurement source.

Continuous range measurement is possible, as opposed to discrete measurement of conventional systems.

The device is easily implemented on machine tools.

Other objectives, advantages, and various further features of novelty and invention will be pointed out or will occur to those skilled in the art from a reading of the following specification in conjunction with the accompanying drawings.

DETAILED DESCRIPTION OF THE INVENTION

Figure 1:
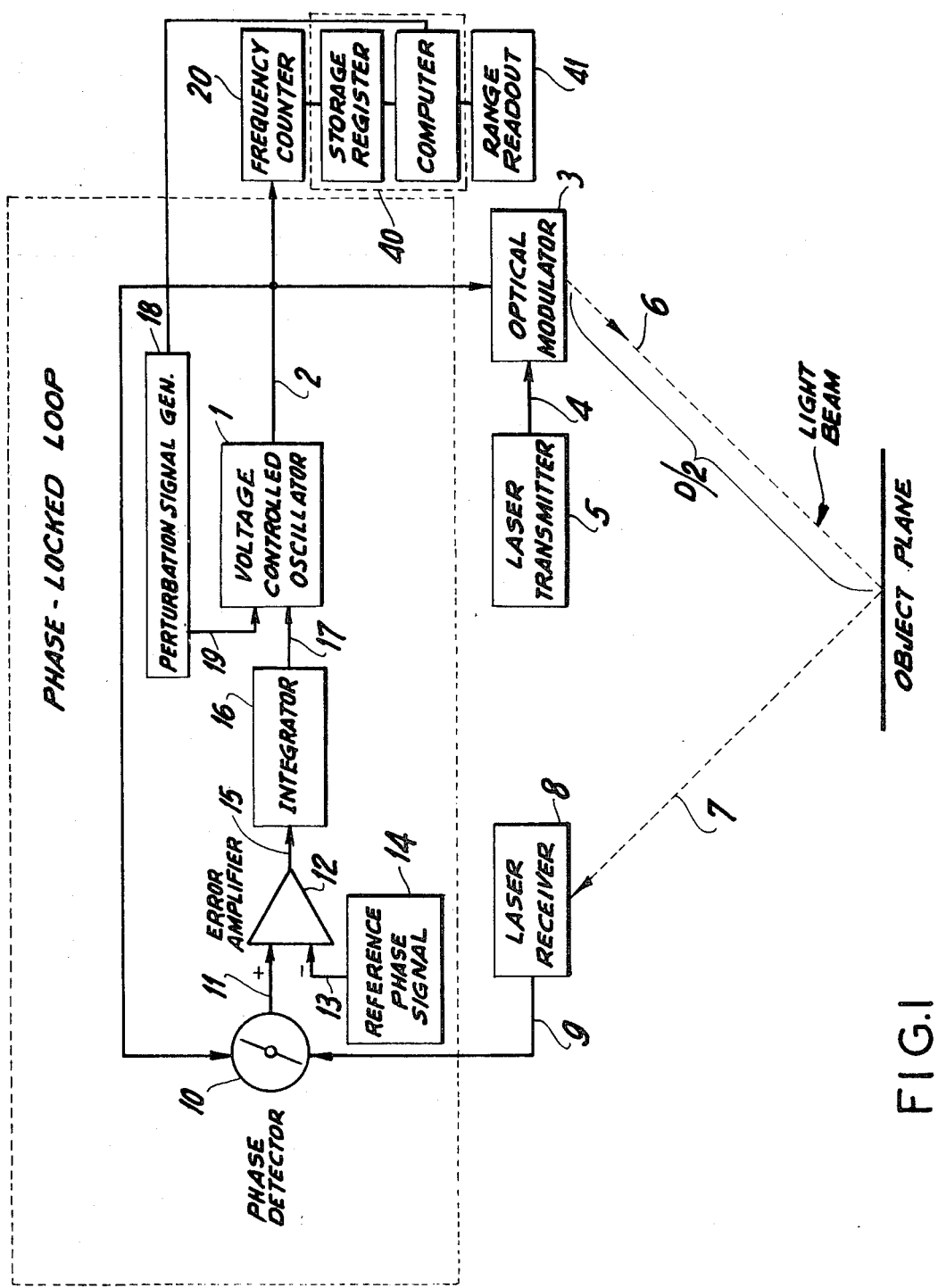
FIG. 1 is a schematic block diagram of a distance measuring device of the invention.

Referring now to FIG. 1, a laser distance measuring device constructed in accordance with the teachings of the the invention is illustrated.

The heart of the device is a voltage controlled oscillator 1 the output 2 of which is first fed to an optical modulator 3 where it modulates the output 4 of a laser transmitter 5. The modulated output 6 of the laser transmitter is directed toward the object to which the distance is to be measured. Reflected portions 7 of the modulated laser beam 6 are received by a laser receiver 8 where the modulating signal 2 is detected. This detected signal output 9 of laser receiver 8 is the first input to a phase detector 10. The second input to phase detector 10 is the output 2 of voltage controlled oscillator 1.

The output 11 of phase detector 10 representative of the phase difference between control signal 2 and reflected signal 9 is fed to an amplifier 12. A second input to amplifier 12 is a phase reference signal 13, which constitutes the output of a reference phase signal source 14. Signals 11 and 13 are added and amplified in amplifier 12 and become the output 15 thereof hereinafter referred to as the error signal. Error signal 15 is integrated with respect to time in an integrator 16, the output 17 of which is applied to vary the frequency of voltage controlled oscillator 1.

A perturbation signal generator 18 generates a signal 19 which is periodically fed to voltage controlled oscillator 1, as will be explained, to cause loop stabilization at a second frequency.

The device operates by comparing the phase of control signal 2 of the voltage controlled oscillator 1 with the phase of the reflected signals 9 detected by the laser receiver 8. The output of phase detector 10 is a function of the frequency of signals 2 and the distance traveled by the transmitted signals 6 from the time of transmission until the time of receipt by receiver 8; according to the equation:

$$\phi = fD/C$$

$\phi$ = phase shift between transmitted and received signals.
$f$ = frequency of transmitted signals.
$D$ = distance traversed by signals.
$C$ = speed of signal traversing the path to and from target.

The output of phase detector 10 is a DC voltage proportional to the difference in phase between modulating signals 2 and reflected signals 9, which output is in turn proportional to the distance traversed by light beam 6–7.

The DC output 11 of phase detector 10 is fed to an amplifier 12 where it is algebraically added to a DC phase reference signal 13, to obtain an error signal 15. Phase reference signal 13 functions to establish a standard phase angle so that the system will always stabilize at the same phase angle. Since the system only utilizes the difference in frequency for the measurement, the value of the reference phase signal is unimportant. What is important is that the reference phase signal is constant during the measurement period.

Error signal 15 is amplified by amplifier 12 and integrated by integrator 16 over an appropriate time interval, for example 1 second. The output 17 of integrator 16 is applied to the voltage-controlled oscillator 1 so as to cause the frequency of control signal 2 to seek a phase match within comparator 10. When the frequency of signal 2 becomes such that the desired phase match, controlled by phase reference signal 13, is achieved within phase detector 10, error signal 15 becomes zero, output 17 of integrator 16 will be constant, and the frequency of signal 2 will cease to change. The circuit described thus forms a phase-locked loop which "locks on" in phase at a frequency determined by the distance to the target.

In the configuration of the invention illustrated in FIG. 1, the frequency of the control signal 2 is measured by a frequency counter 20, in the manner familiar to those skilled in the art, and the first frequency $F_1$, at which the oscillator stabilizes is recorded. A perturbing voltage 19, from a controllable source 18, sufficient in degree to cause the phase-locked loop to seek lock-on at the next higher or lower frequency $F_2$ to the first frequency $F_1$ at which the first lock-on was achieved, is then applied to the voltage controlled oscillator 1. The next frequency $F_2$ at which the phase-locked loop locks on is also recorded.

The distance to the target can be calculated from $F_1$ and $F_2$ in accordance with the following equation:

$$D = C/\Delta F = C/F_2 - F_1 \quad (\text{where } F_2 > F_1)$$

where $D$ = distance to the target in meters.
$C$ = speed of light in meters per second.
$\Delta F$ or $F_2 - F_1$ = change in frequency in radians per second.

For example:
$C = 3 \times 10^8$ meters/sec.
$\phi REF = 0°$
$F_1 = 10$ mc. $= 2\pi \times 10^7$ radian/sec.
$F_2 = 10.1$ mc. $= 2\pi \times 1.01 \times 10^7$ radian/sec.
$\therefore D = 3 \times 10^3$ meters Only at $3 \times 10^3$ meters are the adjacent phase loop nulls separated by exactly 100 kc.

This may be verified from the previous equation:

$$\Delta\phi = \Delta f D/C$$

or $$2\pi = (10.1 - 10) \times 2\pi \times 10^6 \quad D/3\times10^8 \rightarrow D = 3 \times 10^3 \text{ meters}$$

This calculation may be accomplished manually, or by a simple computer 40 of a type known to those skilled in the art, programmed to record $F_1$ and $F_2$ and perform the aforementioned calculations and display the distance to the target on a readout 41.

Figure 2:
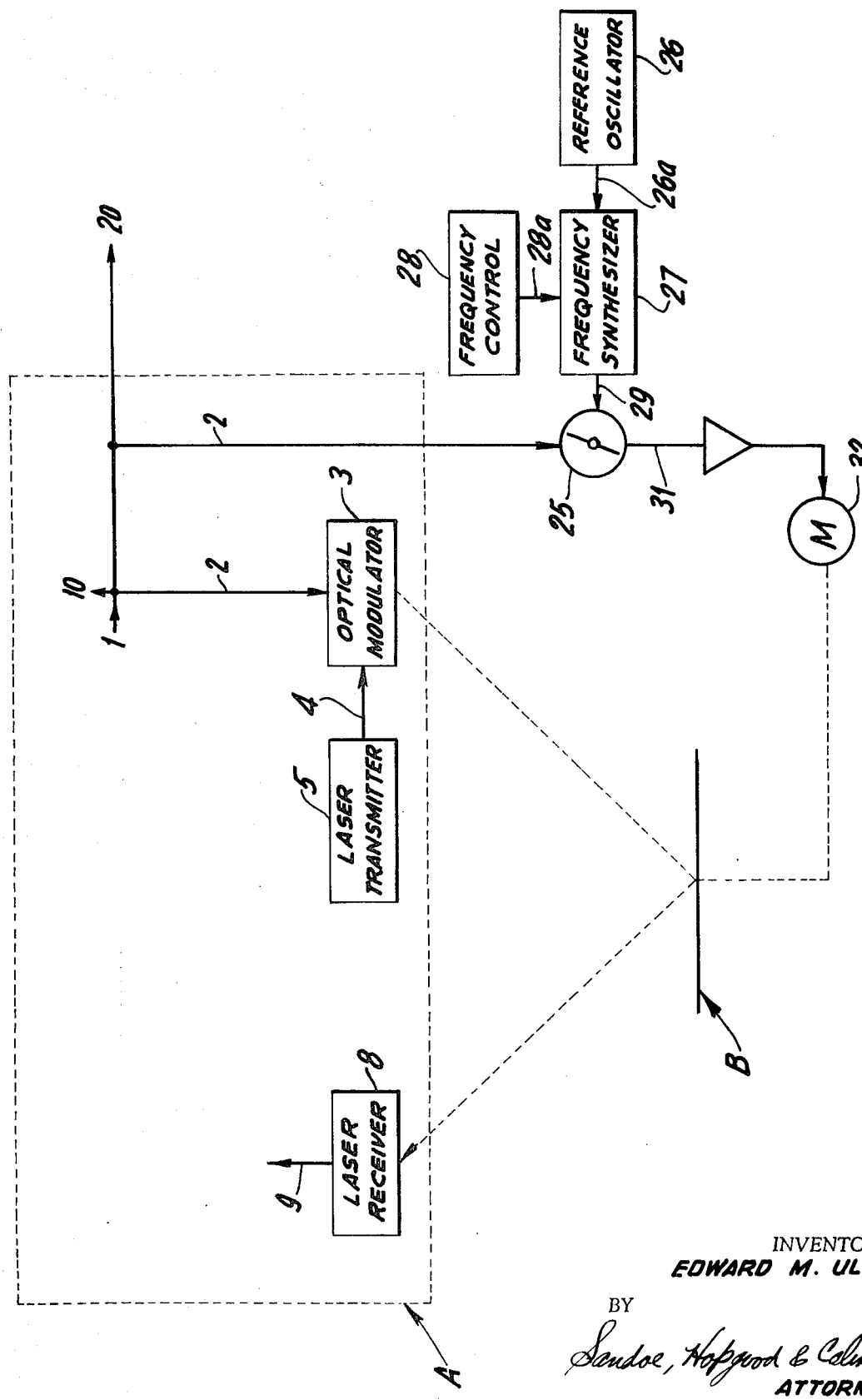
FIG. 2 is a schematic block diagram of a distance adjusting device of the invention.

FIG. 2 illustrates the distance determining feature of the invention as employed to regulate the distance between two objects.

In this embodiment of the invention, the output signal of the voltage controlled oscillator 1 is fed to a second phase detector 25, where it is compared with a reference signal 29 to produce an error signal 31 corresponding to the error in the distance between device A and target B. Error signal 31 drives a serve motor 32 to position target B closer or further from device A. As previously described, moving of target B will cause the phase-locked loop of detector A to "lock-on" at a different frequency. Movement of target B in response to error signal 31 will ultimately result in "lock-on" at the frequency of control signal 29; at which point error signal 31 will become zero and target B will be at the selected distance from detector A.

Reference signal 29 is originated by a crystal reference oscillator 26 having an output signal 26a which is one input to a frequency synthesizer 27.

Reference signal 29 is adjusted in synthesizer 27 by the action of a frequency control unit 28. The output 28a of frequency control unit 28 is a second input to synthesizer 27 and functions to vary the frequency of reference signal 29 in 1 c.p.s. steps.

In operation, the frequency $F_3$ of reference signal 29 is established in accordance with the distance to be maintained by the target from the detecting device A, as follows. As above described, in connection with FIG. 1, the frequencies at which the phase-locking loop of distance detector A will stabilize is a function of distance, or, stated differently, a given distance will produce lock-on at a specific set of frequencies which can be calculated from the following equation:

$$\Delta\phi = \Delta f D/C$$

From the previous example at $3 \times 10^3$ meters distance, $\Delta f$ is 100 kc.

By establishing reference signal 29 at one of the frequencies so calculated, the output signal 2 of voltage controlled oscillator 1 will stabilize at $F_3$ when target B is at the selected distance from detector A.

The accuracy and stability of the crystal oscillator 26 can be translated as accuracy of measurement and positioning as follows. A crystal oscillator with stability and accuracy of 1 in $10^7$ is available; or if a Cesuim atomic standard is utilized an accuracy of 1 in $10^{11}$ can be achieved. The frequency synthesize 26 provides resolution of distance for positioning with the accuracy of the reference signal by varying the reference signal in 1 c.p.s. steps. For example if a reference signal of 10 mc. is used at 1,000 feet roundtrip, a 1 c.p.s. change in reference signal 29 ($F_3$) will be equivalent to a 0.0001 foot change in position of target B. Such accuracy may be expected with a reference oscillator having accuracy and stability of 1 in $10^7$.

It is apparent from the foregoing that the invention provides a unique and extremely accurate distance measuring and positioning device which may be readily adapted to use in a great variety of particular situations.

While the principles of the invention have been described in connection with the above specific apparatus, it is to be clearly understood that this description is made only by way of example and not as a limitation to the scope of the invention.

What is claimed is:

1. A distance measuring device comprising
   means to transmit electromagnetic signals in the direction of a target,
   said transmitting means including voltage controlled variable frequency generator means to generate a control signal and means to modulate said transmitted signals with said control signal,
   means to receive portions of said transmitted signals and detect the modulating signal thereon,
   phase detector means to detect the phase difference between the output of said variable frequency generator means and the modulating signal detected upon said received signal, and generate an output representative thereof,
   means to generate a phase reference signal,
   means to combine the output of said phase detector means and said phase reference signal producing a phase error signal,
   said phase detector, voltage controlled variable frequency generator means and combining means, comprising a phase-locked loop in which said voltage controlled frequency generator responds to said error signal by changing frequency until said error signal becomes zero, and said variable frequency generator stabilizes at a first frequency characteristic of the distance to the target,
   means to indicate the frequency of said variable frequency generator means and,
   means to perturb said phase-locked loop so as to cause said variable frequency generator to stabilize at a second frequency characteristic of the distance to the target, adjacent in value to the first frequency at which said variable frequency generator stabilized.

2. The device of claim 1, further including computer means, responsive to said frequency indicator means to calculate the distance to the target, including
   means to record the frequencies at which said phase-locked loop stabilizes, and
   means connected to said loop perturbation means to actuate the same after said variable frequency generator has stabilized at a first frequency, and
   readout means to display the calculated distance to the target.

3. An electromagnetic echo ranging device comprising
   means to transmit a variable frequency continuous electromagnetic interrogating signal,
   means to receive portions of said interrogating signal reflected by a target,
   means to compare the phase of the reflected portions of said interrogating signal with the phase of the transmitted signals and produce an error signal representative thereof, said transmitting means being responsive to said error signal to vary the frequency of said transmitted signal to a frequency at which the phase of said received signal matches the phase of said transmitted signal, means to change the transmitting frequency of said variable frequency transmitter to a frequency from which said error signal will induce said variable frequency transmitter to seek a phase match between said transmitted and received signals at a second frequency adjacent in value to the first frequency at which a phase match occurred, means to indicate the frequencies at which said phase matches occur.

4. A device for controlling the distance between a distance measuring device and a target object wherein said distance measuring device comprises variable frequency transmitter means to transmit a continuous electromagnetic interrogating signal, means to receive portions of said interrogating signal reflected by a target, means to compare the phase of the reflected portions of said interrogating signal with the phase of the transmitted signals and produce an error signal representative thereof, said transmitting means being responsive to said error signal to vary the frequency of said transmitted signal to a first frequency at which the phase of said received signal matches the phase of said transmitted signal, variable frequency signal generator means to generate a reference signal at a selected frequency representative of the desired distance to the target object, means to compare said reference signal with said transmitted signal and produce a correction signal representative of the phase difference therebetween, and means responsive to said correction signal to move the target object to a position where the frequency at which the phase of said received signal matches the phase of said transmitted signal is equal to said reference frequency.

* * * * *